Figure 1:
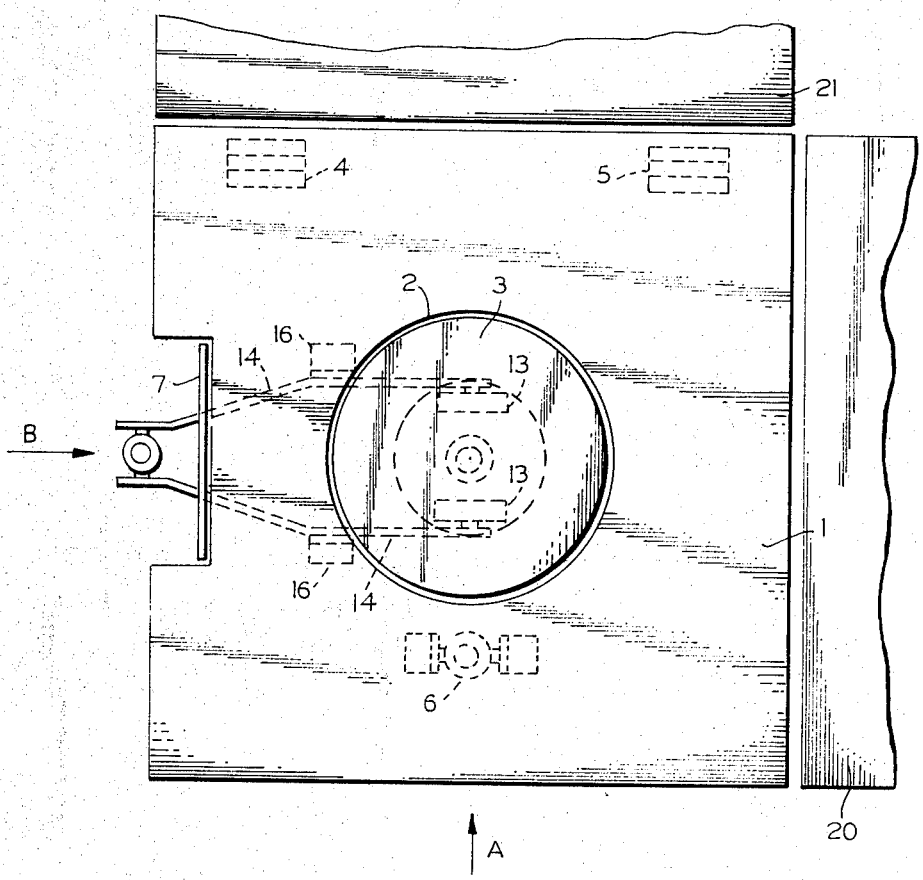
Figure 2:
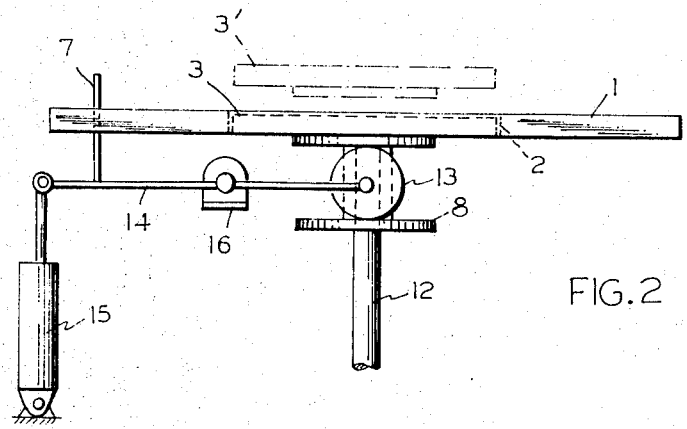
Figure 3:
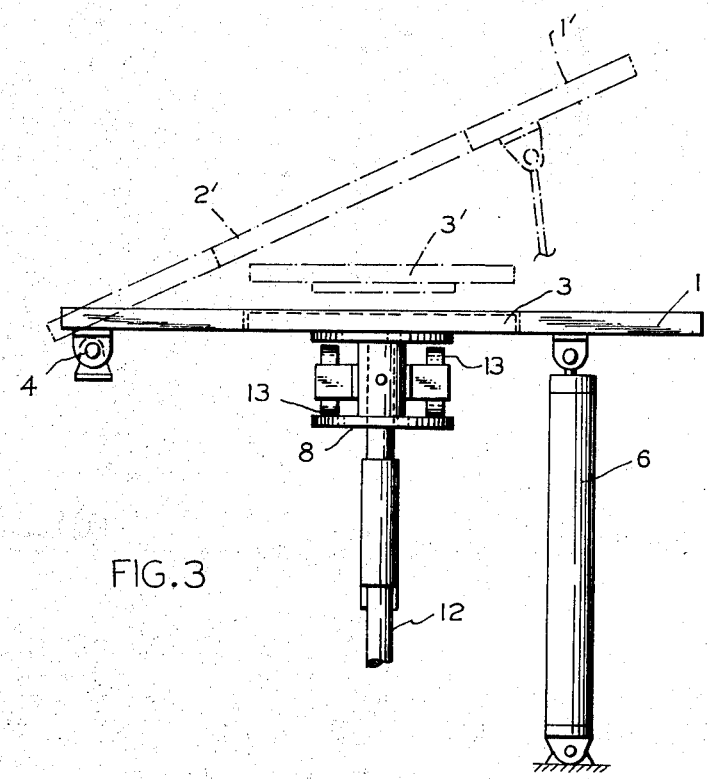
Figure 5:
Figure 4:
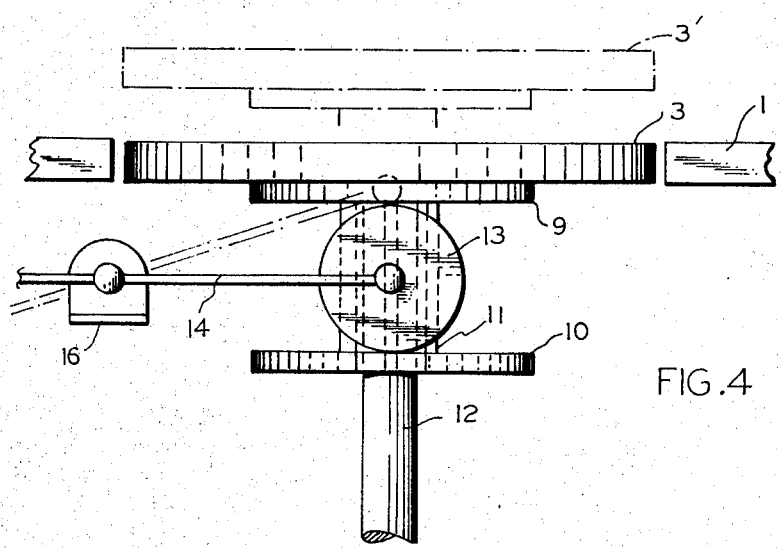

United States Patent

[11] 3,538,989

| [72] | Inventor | Robert Dean<br>Felixstowe, England |
|---|---|---|
| [21] | Appl. No. | 731,545 |
| [22] | Filed | May 23, 1968 |
| [45] | Patented | Nov. 10, 1970 |
| [73] | Assignee | By mesne assignments to Fisons Limited,<br>Felixstowe, England, a British company |
| [32] | Priority | May 31, 1967 |
| [33] | | Great Britain |
| [31] | | 25,062/67 |

[54] CONVEYING
7 Claims, 5 Drawing Figs.

[52] U.S. Cl. ............................................... 198/20,
198/33
[51] Int. Cl. .................................................. B65g 47/00
[50] Field of Search .......................................... 198/20, 27,
33, 33.2(R); 271/36; 104/99; 214/1(R)

[56] References Cited
UNITED STATES PATENTS

| 1,295,195 | 2/1919 | Parker .......................... | 198/27UX |
| 1,967,761 | 7/1934 | Von Reis ...................... | 198/20UX |

FOREIGN PATENTS

| 706,569 | 3/1954 | Great Britain ............... | 198/27 |

*Primary Examiner*—Richard E. Aegerter
*Assistant Examiner*—Douglas D. Watts
*Attorney*—Wenderoth, Lind and Ponack

ABSTRACT: A device for transferring articles between endless conveyors set at an angle to each other wherein a tilting platform and turntable cooperate to change the direction of the article.

INVENTOR
ROBERT DEAN

INVENTOR
ROBERT DEAN

BY *Wenderoth, Lind & Ponack*
ATTORNEYS

CONVEYING

The present invention relates to improvements in the conveying of unit articles such as filled sacks or bags, cartons, boxes, cases, barrels and other portable containers.

Unit articles are usually conveyed by means of conveyors such as belt conveyors, roller conveyors, apron conveyors, gravity runways or slides and the like. The present invention is concerned with a system capable of transferring unit articles from one conveyor of this type (hereinafter referred to as the feed conveyor) to another conveyor (hereinafter referred to as the takeoff conveyor) wherein the directions of motion imparted by the two conveyors are at an angle to each other or are in a straight line.

Accordingly the present invention is for a conveyor system comprising a feed conveyor and a takeoff conveyor generally arranged end to end, there being situated at and between these ends of the conveyors, a platform capable of being tilted whereby any unit article delivered to the platform by the feed conveyor slides onto the takeoff conveyor upon tilting the platform.

Preferably the platform is hinged at that end of the platform adjacent to the takeoff conveyor or otherwise pivoted so that the platform can be tilted about the hinge or the pivot. In this instance the conveyors are at the same level. If the platform tilts about a pivot which is not so located, the conveyors are, of course, situated at different levels.

According to a preferred embodiment of the invention the platform is provided with an aperture, preferably located centrally of the platform, through which can be raised and lowered a turntable which, upon being raised before the platform is raised, is adapted to rotate any article which is on the platform through any desired angle.

The present invention is also for a device capable of aligning an article prior to feeding it to a takeoff conveyor and then feeding the article to the takeoff conveyor which comprises a platform provided with a pivot and having an aperture therein, means for raising and lowering the platform about the pivot, a turntable and means for raising and lowering the turntable through the aperture in the pivoted platform.

Suitably there is provided means for locating the article on the platform, this means desirably locates the article over the aperture in the platform.

The aperture in the platform is desirably of such a size that the articles being conveyed are still supported by the platform when they straddle the aperture. Preferably the turntable is positioned in the aperture slightly below the level of the surface of the platform when the turntable and the platform are in the lowered position.

Preferably the direction of motion imparted by the feed conveyor to the unit article is substantially at right angles to the direction of motion imparted by the takeoff conveyor.

The platform is desirably provided with a low friction surface such as for example a surface of polytetrafluoroethylene.

The present invention is illustrated in the accompanying drawings in which:

FIG. I is a plan view of the system and device according to the present invention.

FIG. II is an elevational view of FIG. 1 as seen from arrow A.

FIG. III is an elevational view of FIG. 1 as seen from arrow B.

FIG. IV is an enlarged view of the turntable raising device as shown in FIG. II and, FIG. V is a cross section of the upper end of shaft 12 shown in FIG. IV.

Referring to FIGS. I—III there is shown a hinged platform 1 having a central aperture 2 through which can be raised and lowered a turntable 3. The raised position of platform 1 is shown in FIG. III in broken lines, the platform in this position being identified as 1¹ and the aperture as 2¹. The raised position of turntable 3 is shown in FIGS. II, III and IV, the turntable in this position being identified as 3¹.

Platform 1 is provided with hinges 4 and 5. A power cylinder 6 is connected to the free end of platform 1 and is adapted to raise and lower platform 1 about hinges 4 and 5.

Turntable 3 lies within aperture 2 of platform 1. The surface of turntable 3 in the lowered position is arranged to lie just below the surface of platform 1 when both are in the lowered position.

Connected to turntable 3 is a collar 8 the detailed construction of which is shown in FIG. IV. Referring to FIG. IV it is seen that collar 8 consists of a pair of circular plates 9 and 10 joined by an internally splined housing 11. The splines of housing 11 match the splines of the upper end of shaft 12, a cross section of which is shown in FIG. V. Collar 8 is arranged to slide freely on shaft 12. Shaft 12 is rotatably driven by a motor which is not shown in the drawings.

Shown resting on plate 10 of collar 8 are a pair of freely rotatable wheels 13 which are joined by a pair of levers 14 to a power cylinder 15. Levers 14 turn about fulcrums 16. A member 7 which acts as a stop is joined to lever 14 and extends through a slot to project above the surface of platform 1 when both platform 1 and turntable 3 are in the lowered position.

Adjacent to platform 1 are provided a feed conveyor 20 and a takeoff conveyor 21.

In operation turntable 3 is rotated continuously. Turntable 3 is driven by the splined connection between shaft 12 and collar 8, shaft 12 itself being driven by the motor.

Unit articles for example sacks are fed by conveyor 20 onto platform 1 where they are prevented from overshooting by stop 7 which also serves to locate the sack over aperture 2. A time relay which is operated when the sack passes a detecting device on conveyor 20 sets a series of operations into effect. Firstly, if the alignment of the sack is to be altered, turntable 3 is raised to position 3¹ thus bearing upon the underside of the sack and raising it clear of platform 1. As the sack rises clear of platform 1 it is rotated and during this rotation the second operation comes into effect. The second operation consists in raising platform 1 above the raised level of turntable 3 to position 1¹ thereby removing the sack from the turntable, this being timed to occur when the sack has been aligned by the turntable in the required direction. The sack then slides onto conveyor 21. To illustrate this with a specific example a sack may be fed from conveyor 20 onto platform 1, the sack being aligned in a N-S position. If this sack were to be re-aligned in the E-W position platform 1 would rise within that interval of time after the rising of turntable 3 which would allow the sack to be rotated through 90°. At this juncture platform 1 would rise to remove the sack from turntable 3. Upon the discharge of the sack onto conveyor 21, platform 1 and turntable 3 return to their original positions.

Naturally if it is not desired to realign the sack before it is transferred to conveyor 21 the operation may be accomplished without raising and lowering turntable 3. In this case, however, in order to maintain the spacing of the sacks upon conveyor 21 constant, it is desirable to delay raising platform 1 for that amount of time necessary to realign the sack even though the realignment operation is not performed.

The raising and lowering of turntable 3 is controlled by power cylinder 15 which itself is operated by a timing device controlled by a photoelectric cell. When power cylinder 15 is operated it pulls down levers 14 which, turning about fulcrum 16, raise wheels 13. In this way wheels 13 which initially had been idling on rotating circular plate 10, are brought to bear on the underneath surface of circular plate 9. This has the effect of raising turntable 3, the drive to which from which the motor is retained throughout due to the interaction of the splines of housing 11 of collar 8 and the splines of shaft 12 which nevertheless allow shaft 12 and collar 8 to slide apart. As lever 14 turns about fulcrum 16 this also causes stop 7 to lower thereby avoiding obstruction of the movement of the sack by stop 7.

The raising of platform 1 is achieved by operation of power cylinder 6 which turns platform 1 about hinges 4 and 5. Power cylinder 6 is also operated by the timing sequence initiated by the timing device controlling power cylinder 15.

I claim:

1. A device capable of receiving an article from a feed conveyor, aligning it and transferring it to another conveyor or location, which device comprises a platform provided with a pivot and having an aperture therein; means for raising and lowering said platform about said pivot; a turntable and means for raising and lowering said turntable through said aperture in said pivoted platform whereby said turntable is adapted to rotate said article which may be fed to said platform through any desired angle.

2. A device as claimed in claim 1 wherein means is provided for locating said article on said platform.

3. A device as claimed in claim 1 wherein said aperture is of such a size that said article fed to said platform straddles said aperture.

4. A device as claimed in claim 1 wherein said turntable is positioned slightly below the level of the surface of said platform when said turntable and said platform are both in the lowered position.

5. A device as claimed in claim 1 wherein the platform is provided with a low friction surface.

6. A conveyor system which comprises a device as claimed in claim 1 provided with a feed conveyor, whereby articles may be fed to said platform of said device, and a takeoff conveyor adapted to receive articles displaced from said device by the tilting of said platform.

7. A conveyor system as claimed in claim 6 wherein the direction of motion imparted by said feed conveyor to said article is substantially at right angles to the direction of motion imparted by said takeoff conveyor.